United States Patent
Yen (10) Patent No.: US 11,481,333 B2
(45) Date of Patent: Oct. 25, 2022

(54) METHOD, ELECTRONIC DEVICE, AND COMPUTER PROGRAM STORAGE FOR HASHING AND DIVIDING DATA

(71) Applicant: HON HAI PRECISION INDUSTRY CO., LTD., New Taipei (TW)

(72) Inventor: Chien-Wu Yen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/404,986

(22) Filed: Aug. 17, 2021

(65) Prior Publication Data
US 2022/0050782 A1     Feb. 17, 2022

(30) Foreign Application Priority Data
Aug. 17, 2020   (CN) .......................... 202010827226.4

(51) Int. Cl.
*G06F 12/08*     (2016.01)
*G06F 12/0864*   (2016.01)

(52) U.S. Cl.
CPC ...... *G06F 12/0864* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 2009/0006607 A1* | 1/2009 | Bu | ........................ | H04L 43/028 709/224 |
| 2017/0255676 A1* | 9/2017 | Attaluri | ............... | G06F 16/2255 |
| 2020/0019476 A1* | 1/2020 | Arevalo | .............. | G06F 12/0815 |

* cited by examiner

*Primary Examiner* — Tracy C Chan
(74) *Attorney, Agent, or Firm* — ScienBiziP, P.C.

(57) ABSTRACT

A method of processing and storing general data by means of hardware obtains initial unhashed data and a fixed value. If a value of the initial unhashed data is greater than the fixed value, the initial data is divided into N sub-data or segments. A size of each sub-data is not more than the fixed value, N being an integer greater than 1. The collection of sub sets of data is input into a memory of the electronic device after hashing.

18 Claims, 6 Drawing Sheets

METHOD, ELECTRONIC DEVICE, AND COMPUTER PROGRAM STORAGE FOR HASHING AND DIVIDING DATA

FIELD

The subject matter herein generally relates to data processing.

BACKGROUND

Security of hardware devices, such as some sensors and smart devices, is very important because of potential attacks from viruses, hackers, and electronic theft of information. However, these hardware devices are often restricted in computing ability, memory capacity, and energy consumption of a central processing unit (CPU). Any shortfall in the above capabilities may limit an application of a traditional hash processing method.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

In general, "hashing" transforms an input of any length into an output of a fixed length by means of a hashing algorithm. The output is a hash value. A space of the hash value is usually smaller than a space of the input. Different inputs may be hashed into an identical output (a collision output) but it is impossible to determine the unique input of unhashed data from the hashed value. A hash function is a function for compressing a message of any length into a message summary of a fixed length.

In this embodiment, a definition of hash function H(x) is:
H(x1)=h1, H(x2)=h2, wherein lengths of h1 and h2 are the same.

H(x1)=h1, H(x2)=h2, wherein if h1=h2, x1 is equal to x2.

If x1 and x2 are different, there is very low probability that h1 and h2 are the same.

H(x1)=h1, x1 cannot be inverted from h1.

A hash algorithm can be applied in an electronic device and to applications of the electronic device. For example, the hash algorithm can be used in error correction, voice recognition, and information security. In this embodiment, information security can include file verification, digital signature, and authentication protocols.

Figure 1:
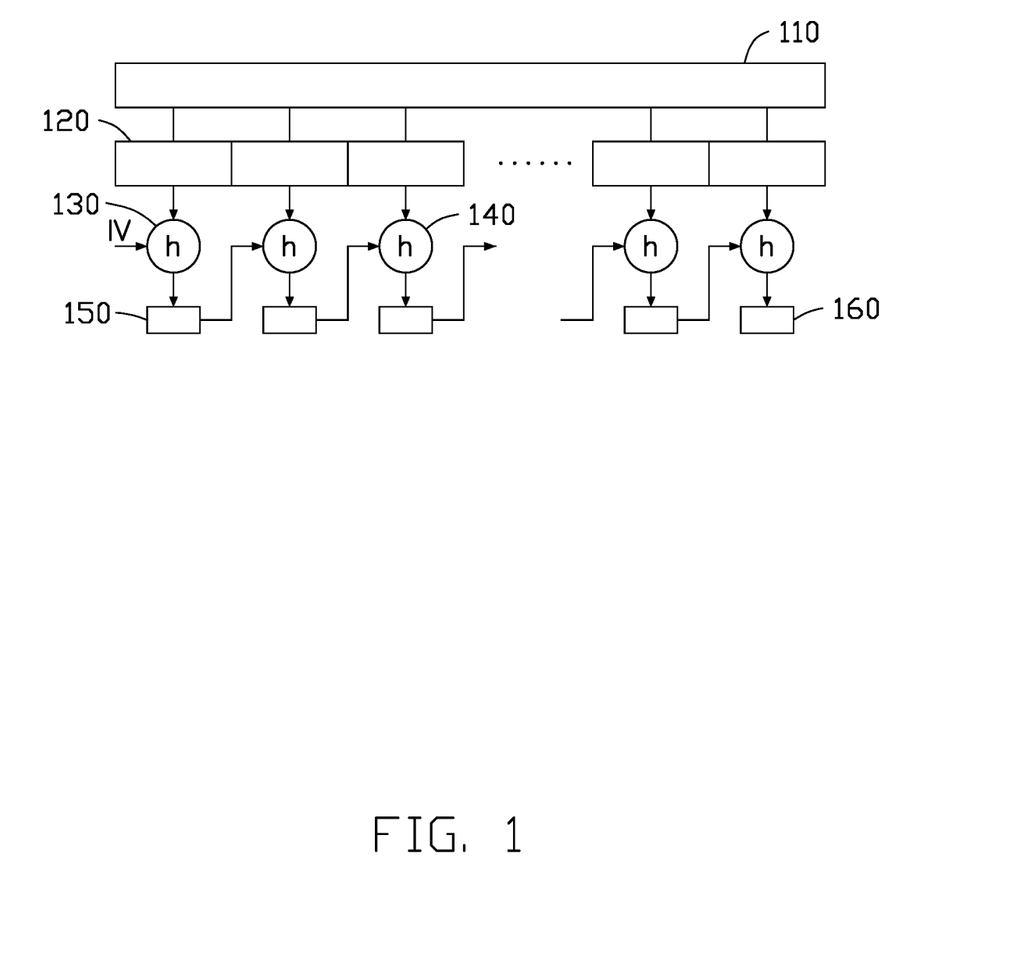
FIG. 1 is a diagram illustrating a traditional hash structure.

FIG. 1 illustrates a flowchart of a method for processing by hash, implemented by software. A 64-bit operating system is installed on an electronic device, for example, a PC. The electronic device includes a processor and a static memory storage. The electronic device further carries a software operating platform. After a user enters data, the operating platform performs operations on such data, as shown in FIG. 1.

In detail, FIG. 1 shows an input data 110, sub-blocks 120, an initial vector 130, a hash function 140, an internal hash state value 150, and a final hash value 160. The input data 110 is an initial unhashed data. The sub-blocks 120 are sub-blocks or segments of the data input into hash calculation. In this embodiment, the hash processing is a calculation of data blocks and hash functions. In detail, the input data 110 is divided into sub-blocks 120. For a first block of the sub-blocks 120, the initial vector 130 is used for hashing to obtain the internal hash state value 150. The internal hash state value 150 of the first block of the sub-blocks 120 is output as the initial vector to a second block of the sub-blocks 120, and so on, until the final hash value 160 is calculated and outputted.

In this embodiment, the hash processing can be implemented by software or hardware. When the hash operation or the hash processing is implemented by software, all data is input to a memory at one time when inputting data, and the software processes all the data. The processing requires division of data. Division of the data into sub-blocks is a preprocessing operation of the hash operation, the purpose is to make all inputted data conform to a standard format.

When the hash operation or the hash processing is implemented by hardware, the hardware device is limited by its resources, such as a memory limiting size of data to be stored, and thus the conventional hash operation cannot be implemented by hardware. A method to solve this problem is disclosed, the method uses hardware to hash large amounts of data.

Figure 2:
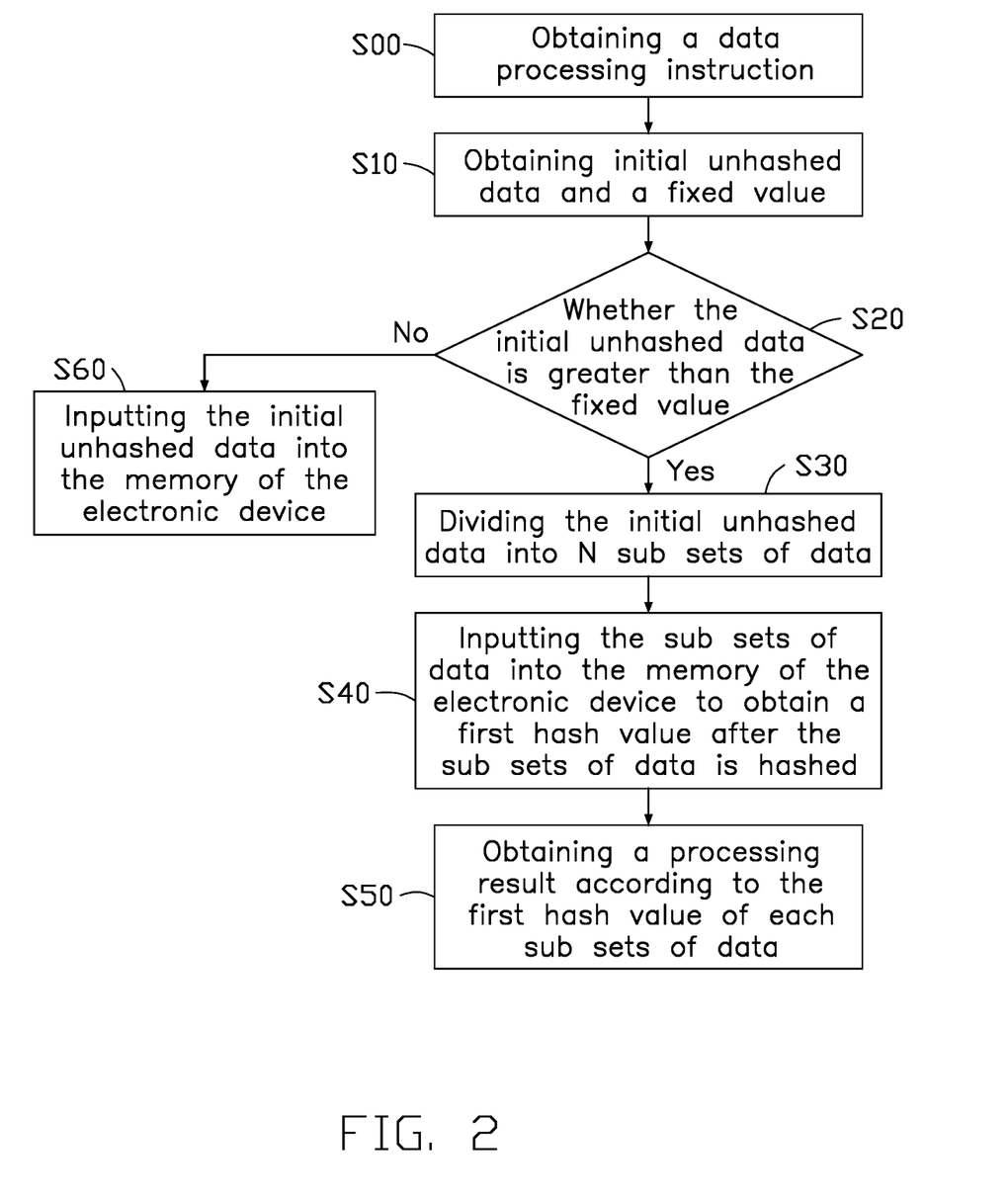
FIG. 2 is a flowchart of a method for processing data according to an embodiment of the present disclosure.

FIG. 2 illustrates a flowchart of a data processing method. The method is provided by way of example, as there are a variety of ways to carry out the method. Each block shown in FIG. 2 represents one or more processes, methods, or subroutines which are carried out in the example method. Furthermore, the order of blocks is illustrative only and additional blocks can be added or fewer blocks may be utilized without departing from the scope of this disclosure.

At block S00, a data processing instruction is obtained.

In this embodiment, the data processing instruction can be obtained when the electronic device needs to perform hash processing. The hash processing includes, but is not limited to, error correction, voice recognition, file verification, digital signature, and authentication protocol.

In one embodiment, during the hash processing, the data processing instruction can be output by a process or a program that performs the hash processing. In other embodiments, when the hash processing is performed, a data processing device (for example, a data processing device 10 shown in FIG. 5) can be triggered to output the data processing instruction. According to the data processing instruction, the data processing device 10 executes the following blocks to ensure that the hash processing can be implemented by hardware.

At block S10, initial unhashed data and a fixed value are obtained.

Figure 6:
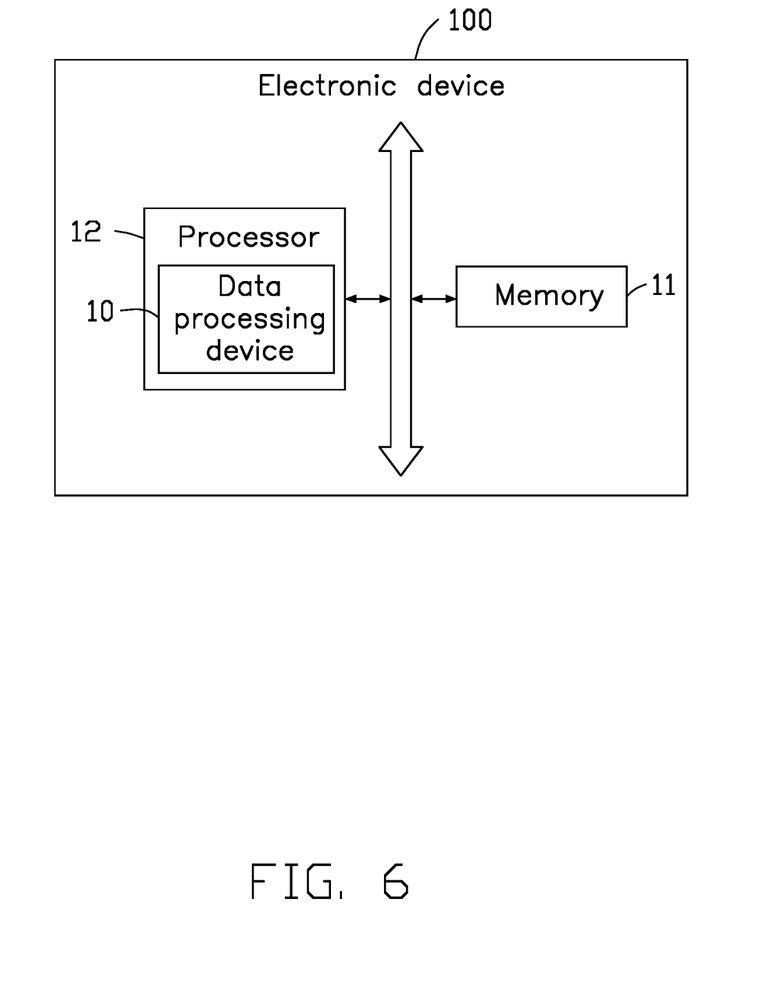
FIG. 6 is a schematic diagram of an electronic device according to an embodiment of the present disclosure.

In this embodiment, the initial unhashed data includes data to be processed of an electronic device (for example, an electronic device 100 shown in FIG. 6). The fixed value includes a fixed value of a memory cache of a memory 11 of the electronic device 100.

In this embodiment, the data processing device 10 reads the initial unhashed data and the fixed value according to the data processing instruction obtained at block S00. For example, when a file verification is to be performed, data of the file to be verified needs to be obtained.

In this embodiment, the initial unhashed data is data to be processed. The initial unhashed data includes digital information, IP packets, disk files, and so on.

In this embodiment, the fixed value of the memory 11 of two different electronic devices 100 may be the same or different. A memory value of each memory 11 may be the same or different, which depends on an actual memory of the memory 11. For a certain electronic device 100, its memory value is fixed. By reading a parameter memory capacity of the memory 11, a data value that the memory 11 can cache is obtained, for example, 64 MB, 128 MB, 256 MB, or the like.

At block S20, whether the initial unhashed data is greater than the fixed value.

In this embodiment, the data processing device 10 compares the size of the initial unhashed data with the fixed value to determine whether the initial unhashed data is greater than the fixed value, so as to detect whether the memory 11 can store the initial unhashed data.

In this embodiment, when the data processing device 10 determines that the value of the initial unhashed data is greater than the fixed value, block S30 is performed. When the data processing device 10 determines that the value of the initial unhashed data is not greater than the fixed value, block S60 is performed.

At block S30, when the value of the initial unhashed data is greater than the fixed value, the initial unhashed data is divided into N sub sets of data.

In this embodiment, a value of each of the sub sets of data is less than or equal to the fixed value, and N is an integer greater than 1.

This embodiment requires data division different from that applied by software. A purpose of division is that when the value of the data to be hashed is too large to be stored in the memory 11 of the electronic device 100, the data is divided and the sub sets of data obtained by the division are input into the memory 11 in batches. That is, the initial unhashed data that is input into the memory 11 in a "time for space" manner.

In this embodiment, a specific method of division may include, but is not limited to, a random division and a fixed division. The random division includes pre-generating a set of random values. The sizes of the random values are random. The data processing device 10 obtains a number of random values according to the number of need to be divided. The data processing device 10 further divides the initial unhashed data in size randomly according to the obtained random values. The size of each segment of data (sub sets of data) after division can be the same or different. When the initial vector is leaked, a division size based on the initial unhashed data is random, and the final hash value cannot be calculated.

In other embodiments, the fixed division can be performed according to a predetermined value. That is, the initial unhashed data is divided according to the predetermined value. The predetermined value is preset. Then, the size of the sub sets of data after division is equal to the predetermined value. The size of the data obtained after division is uniform and is not more than the fixed value.

Figure 3:
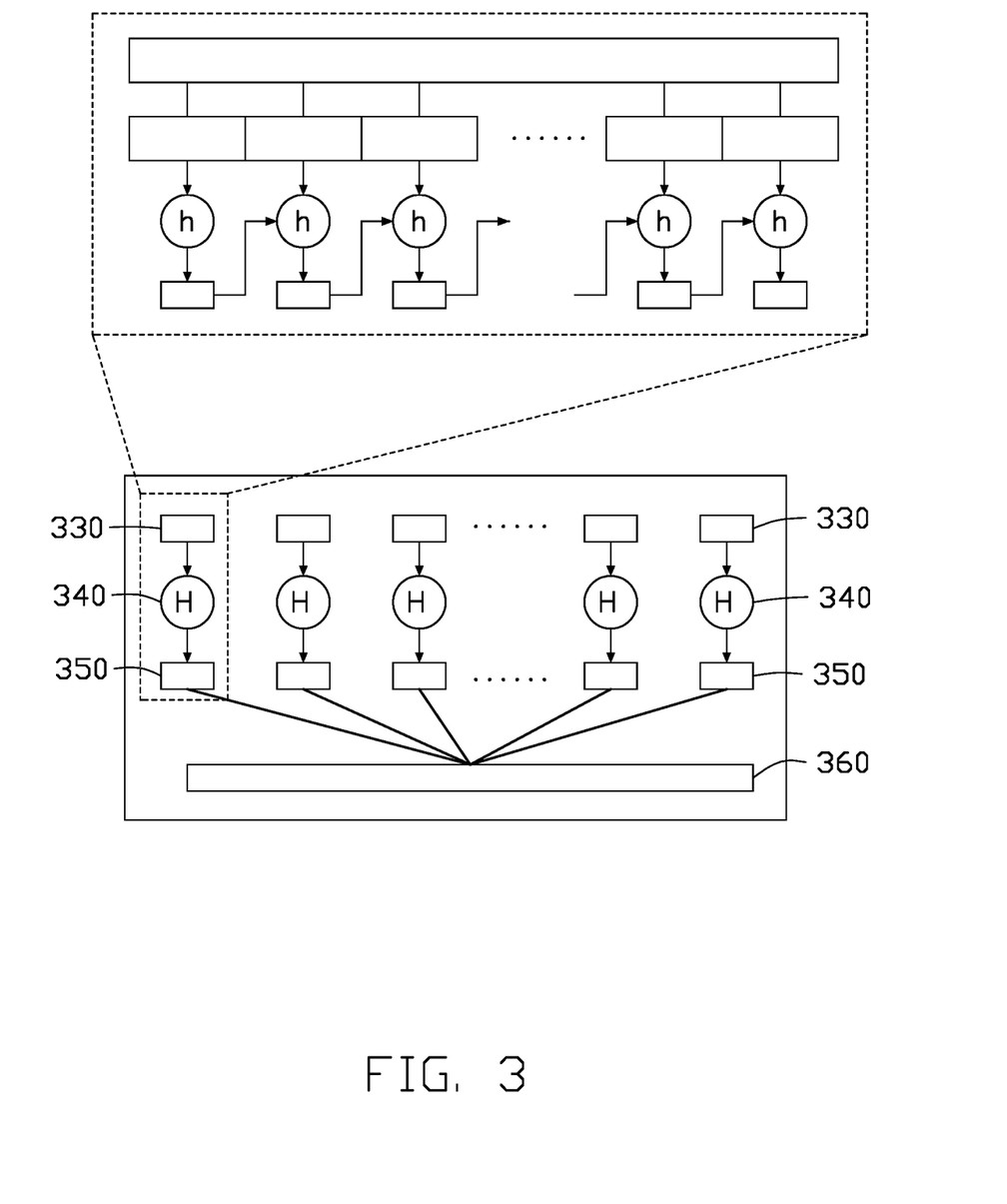
FIG. 3 is a schematic diagram of a division of data according to an embodiment of the present disclosure.

In this embodiment, the value of the divided sub sets of data 330 in FIG. 3 is less than or equal to the fixed value. Based on the random division or the fixed division described above, the size of each sub sets of data 330 may be the same or different. The number N of sub sets of data 330 can be set according to actual conditions.

At block S40, the sub sets of data are input into the memory of the electronic device.

In this embodiment, a group of sub sets of data with variable sizes can be obtained through the random values. After the data processing device 10 inputs the sub sets of data into the memory 11, a processor 12 of the electronic device 100 directly addresses the memory 11 to read the sub sets of data. Each sub sets of data of unhashed data is individually hashed to obtain the first hash value.

In this embodiment, a hash calculation can be performed by a hash function 340 shown in FIG. 3. A specific hash calculation process is illustrated in FIG. 1, which can include preprocessing the input sub sets of data and then applying the hash function. The specific hash processing algorithm can be MD4, MD5, SHA-1, SHA-256, SHA-384, SHA-512, or the like.

At block S50, a result of processing is obtained according to the first hash value of each sub sets of data.

In this embodiment, the first hash value obtained by hashing each sub sets of data is the result of data processing of the initial unhashed data. The data processing device 10 obtains the result of data processing.

In this embodiment, the first hash value, or a second hash value mentioned in this disclosure, is a set of binary values obtained by performing a hash operation on the initial unhashed data.

At block S60, when the value of the initial unhashed data is less than or equal to the fixed value, the initial unhashed data, after being hashed, is input into the memory of the electronic device.

In this embodiment, the value of the initial unhashed data is less than or equal to the fixed value. Then the initial unhashed data can be directly stored in the memory in hashed form. For example, the hash data is directly input into the memory 11. The processor 12 of the electronic device 100 directly addresses the memory 11 to obtain the unhashed data and performs a hash processing on the data obtained from the memory 11.

Figure 4:
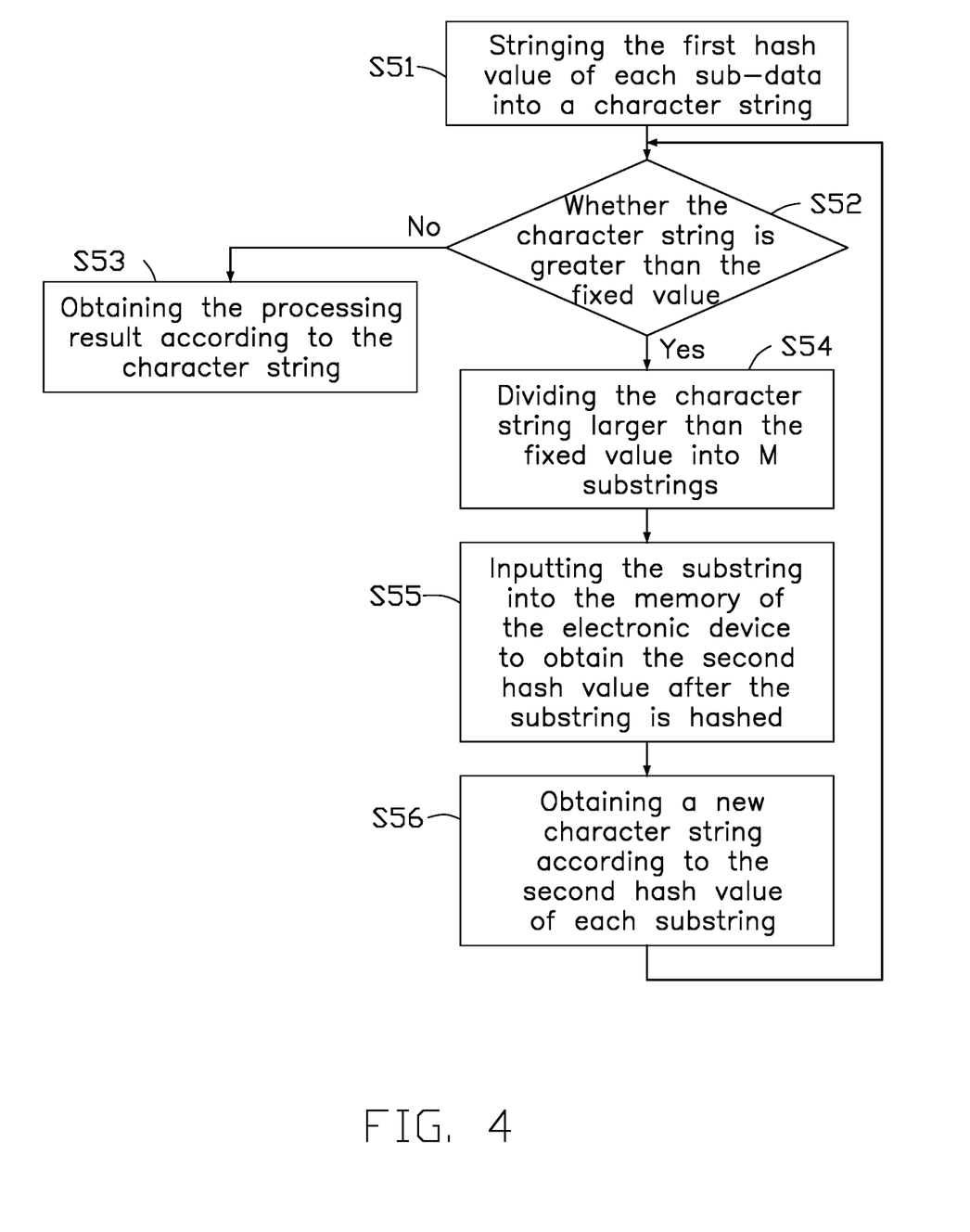
FIG. 4 is a flowchart of a method for obtaining a processing result according to the first hash value of segments of data (sub sets of data), according to an embodiment of the present disclosure.

As illustrated in FIG. 4, in one embodiment, the method for obtaining a processing result includes at least the following sub-blocks S51 to S56.

At sub-block S51, the first hash value of each sub-data is strung into a character string.

As shown in FIG. 3, in this embodiment, the data processing device 10 strings the first hash value 350 of each sub-data 330 into a character string 360. The character string 360 is the result of processing the initial unhashed data by the data processing device 10. The data processing device 10 obtains the processing result based on the character string 360.

At sub-block S52, a determination is made as to whether the character string is greater than the fixed value.

In this embodiment, when the data processing device 10 determines that the value of the character string 360 is less than or equal to the fixed value, sub-block S53 is performed.

At sub-block S53, when a numerical value of the character string is less than or equal to the fixed value, the processing result is obtained according to the character string.

In this embodiment, after the data processing device 10 compares the character string with the fixed value, and determines that the value of the character string is less than or equal to the fixed value, the data processing device 10 directly stores the character string as the final result in the memory 11. The processor 12 addresses the memory 11 to obtain the hash processing result and outputs the character string as the processing result.

In this embodiment, when the data processing device 10 determines that the numerical value of the character string is greater than the fixed value, the following sub-blocks S54-S56 are applied and repeated until the numerical value of the new character string is less than or equal to the fixed value.

In this embodiment, the data processing device 10 compares the sizes of the character string formed by the first hash value and the fixed value. When the character string is greater than the fixed value, multiple hash operations are performed to increase a complexity of a collision attack.

At sub-block S54, the character string larger than the fixed value is divided into M sub strings.

In this embodiment, M is an integer larger than 1.

In this embodiment, when the sub-block S54 is performed, the specific division method can refer to the random division or the fixed division aforementioned to obtain division values with the same or different values.

At sub-block S55, the substring is input into the memory of the electronic device to obtain the second hash value after the substring is hashed.

In sub-block S55, a specific principle of operation of the hash processing is similar to block S40, and therefore not repeated here.

At sub-block S56, a new character string is obtained according to the second hash value of each sub string.

In this embodiment, the data processing device 10 compares the value of the new string obtained by the second hash value of each sub string with the fixed value, until the value of the final string is smaller than the fixed value.

The data processing method of this disclosure compares the value of the initial unhashed data with the fixed value of the memory cache of the electronic device 100 in advance. When the value of the initial data is greater than that of the electronic device 100, the initial data is divided into N sub sets of data, so that the value of each sub-data is less than or equal to the fixed value of the memory cache of the electronic device 100. The method solves the problem of memory of the electronic device 100 being limited. For each sub-data, hash processing is performed according to the initial vector to obtain the first hash value, and the processing result is obtained according to the first hash value of each sub-data, thereby completing the hash processing of the data to be processed on the electronic device 100.

Figure 5:
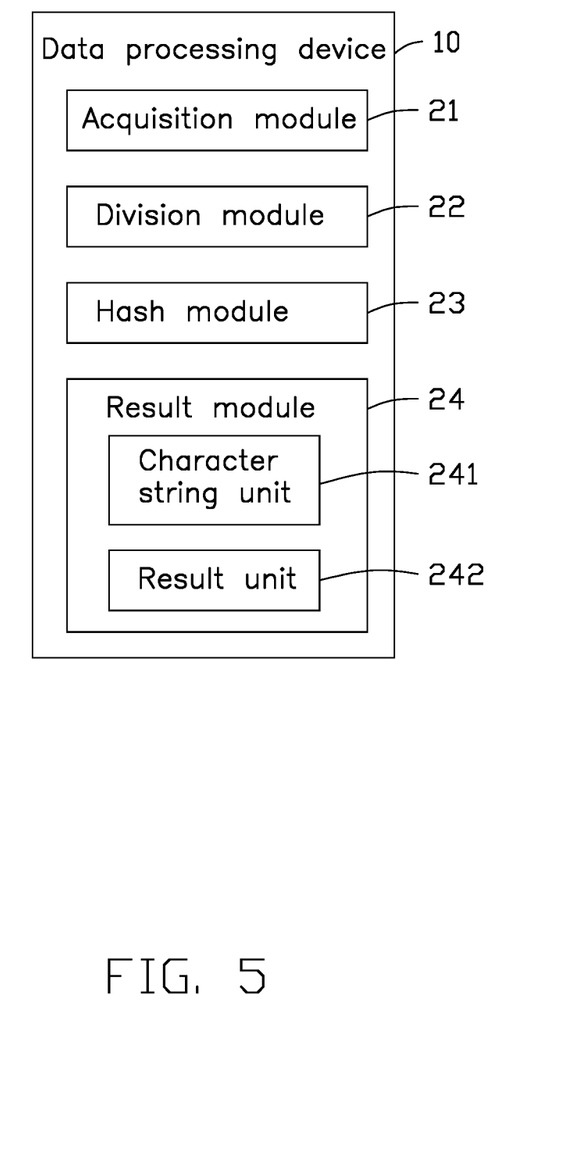
FIG. 5 is a schematic diagram of a data processing device according to an embodiment of the present disclosure.

FIG. 5 illustrates the data processing device 10. The data processing device 10 described in this disclosure can be implemented as a client or as a plug-in. The electronic device 100 can obtain and install the plug-in from a remote server, so as to implement the data processing method through the client or the plug-in. The client may include at least one application program. The client can run on the electronic device 100 to implement the data processing method. The plug-in may include an application program running on the electronic device 100, so as to implement the data processing method.

In some embodiments, the data processing device 10 can be divided into one or multiple functional modules. The one or multiple functional modules may be stored in the processor 12 of the electronic device 100 and executed by the processor 12 to implement the data processing method.

In this embodiment, the one or multiple functional modules may be a series of computer program instruction segments capable of completing specific functions. The instruction segments are used to describe the execution process of the data processing device 10 in the electronic device 100. For example, as illustrated in FIG. 5, the data processing device 10 may be divided into an acquisition module 21, a division module 22, a hash module 23, and a result module 24.

The acquiring module 21 obtains initial unhashed data and a fixed value. The initial unhashed data includes data to be processed by an electronic device (for example, an electronic device 100 shown in FIG. 6). The fixed value includes a fixed value of a memory cache of a memory 11 of the electronic device 100.

The division module 22 divides the initial data into N sub-data when the numerical value of the initial data is greater than the fixed value.

In this embodiment, a value of each sub-data is less than or equal to the fixed value, and N is an integer greater than 1.

The hash module 23 inputs the sub-data into the memory to obtain the first hash value of the sub-data after hash processing.

The result module 24 obtains a processing result according to the first hash value of each sub-data.

In one embodiment, the result module 24 includes a character string unit 241 and a result unit 242. The character string unit 241 strings the first hash value of each sub-data into a character string. The result unit 242 obtains the processing result according to the character string.

In this embodiment, the data processing device 10 can process the initial hash data, so that it can be stored in the memory to complete the hardware implementation of the hash processing. Specific content of the data processing device 10 is dictated by the embodiment of the foregoing data processing method, which will not be described in detail here.

FIG. 6 illustrates the electronic device 100. The electronic device 100 includes, but is not limited to, the memory 11, at least one processor 12, and the data processing device 10. The data processing device 10 runs in the electronic device 100. The foregoing components, for example, the memory 11 and the processor 12, may be connected by a bus.

FIG. 6 shows only an example of the electronic device 100. In other embodiments, the electronic device 100 may also include more or fewer elements, or have different element configurations. The electronic device 100 may include various IoT terminals or devices, including mobile phones, smart watches, smart speakers, virtual reality devices, tablet computers, laptop computers, car computers, desktop computers, e-book readers, MP3 Players, MP4 players, set-top boxes, wearable devices, or the like.

In one embodiment, the memory 11 is the memory of the electronic device 100. The memory 11 is used to store data. The data processing device 10 is logically connected to the memory 11, so that data is input to the memory 11 through the data processing device 10. The processor 12 is connected to the memory 11. The processor 12 directly addresses the memory 11, obtains data for processing, and completes functions, such as hardware implementation of hash processing.

In one embodiment, the processor 12 may be a central processing unit (CPU), or may be other general-purpose processors, a digital signal processor (DSP), an application specific integrated circuit (ASIC), Field-Programmable Gate Array (FPGA) or other programmable logic devices, discrete gate or transistor logic device, discrete hardware components, or the like. The general-purpose processor may be a microprocessor or the processor 12 may be any conventional processor or the like. The processor 12 is a control center of the electronic device 100 and connects various parts of the entire electronic device 100 by using various interfaces and lines.

In other embodiments, if the modules of the data processing device 10 are implemented in the form of a software functional unit and sold or used as a standalone product, the modules can be stored in a computer readable storage medium. Based on such understanding, the present disclosure implements all or part of the processes in the foregoing embodiments, and may also be completed by a computer program to instruct related hardware. The computer program may be stored in a computer readable storage medium. The steps of the various method embodiments described above may be implemented when the program is executed by the processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a Read-Only Memory (ROM), Random access memory (RAM), electrical carrier signals, telecommunications signals, and software distribution media. It should be noted that the content contained in the computer readable medium may be appropriately increased or decreased according to the requirements of legislation and patent practice in a jurisdiction, for example, in some jurisdictions, according to legislation and patent practice, computer readable media does not include electrical carrier signals and telecommunication signals.

It should be noted that the modules described above are based on a logical function division, and there may be other division methods in actual implementation. In addition, each functional unit in each embodiment of the present disclosure may be integrated in the same processing unit, or each unit may exist physically separately, or two or more units may be integrated in the same unit. The above integrated unit can be implemented in the form of hardware or in the form of hardware plus software function modules.

In other embodiments, the electronic device 100 can also include a storing unit (not shown). The one or multiple function modules can be stored in the storing unit and be executed by the processor 12. The storing unit may be an internal memory of the electronic device 100, that is, a memory built in the electronic device 100. In other embodiments, the storing unit may also be an external memory of the electronic device 100, that is, a memory external to the electronic device 100.

In some embodiments, the storing unit is used to store program code and various data, for example, to store the program code of the data processing device 10 installed in the electronic device 100. The storing unit allows automatic access to programs and data during the operation of the electronic device 100.

The storing unit may include random access memory and non-volatile memory, such as a hard disk, a memory, a plug-in hard disk, a smart memory card (Smart Media Card, SMC), a secure digital (SD) card, flash card, at least one disk storage device, flash device, or other volatile solid-state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A method for processing data comprising:
obtaining initial unhashed data and a fixed value, the initial unhashed data comprising data to be processed of an electronic device, the fixed value comprising a fixed value of a memory cache of the electronic device;
when a value of the initial unhashed data is greater than the fixed value, dividing the initial unhashed data into N sub-data, a value of each sub-data being not more than the fixed value, N being an integer greater than one;
inputting the sub-data into a memory of the electronic device to obtain a first hash value after the sub-data being hashed; and
obtaining a processing result according to the first hash value of each sub-data.

2. The method of claim 1, wherein the step of obtaining a processing result according to the first hash value of each sub-data further comprises:
stringing the first hash value of each sub-data into a character string; and
obtaining the processing result according to the character string.

3. The method of claim 2, wherein the step of obtaining the processing result according to the character string further comprises:
- (a1) when a numerical value of the character string is larger than the fixed value, repeating steps (a2)-(a4) until the numerical value of a new character string is less than or equal to the fixed value;
- (a2) dividing the character string larger than the fixed value into M substrings, M being an integer larger than one;
- (a3) inputting the substring into the memory of the electronic device to obtain a second hash value after the sub string is hashed; and
- (a4) obtaining the new character string according to the second hash value of each sub string.

4. The method of claim 2, wherein the step of obtaining the processing result according to the character string further comprises:
when a numerical value of the character string is less than or equal to the fixed value, obtaining the processing result according to the character string.

5. The method of claim 1, further comprising:
when the value of the initial hash data is less than or equal to the fixed value, inputting the initial hash data into the memory of the electronic device to obtain the processing result obtained after the initial hash data is hashed.

6. The method of claim 1, further comprising:
obtaining a set of random values, sizes of the random values are random;
dividing the initial hash data in size randomly according to the random values.

7. An electronic device comprising:
a processor; and
a memory storing data to be processed and a plurality of instructions, which when executed by the processor, cause the processor to:
obtain initial unhashed data and a fixed value, the initial unhashed data comprising data to be processed of an electronic device, the fixed value comprising a fixed value of a memory cache of the electronic device;
when a value of the initial unhashed data is greater than the fixed value, divide the initial unhashed data into N sub-data, a value of each sub-data being not more than the fixed value, N being an integer greater than one;
input the sub-data into a memory of the electronic device to obtain a first hash value after the sub-data being hashed; and
obtain a processing result according to the first hash value of each sub-data.

8. The electronic device of claim 7, wherein the step of obtaining a processing result according to the first hash value of each sub-data further comprises:
stringing the first hash value of each sub-data into a character string; and
obtaining the processing result according to the character string.

9. The electronic device of claim 8, wherein the step of obtaining the processing result according to the character string further comprises:
- (a1) when a numerical value of the character string is larger than the fixed value, repeating steps (a2)-(a4) until the numerical value of a new character string is less than or equal to the fixed value;
- (a2) dividing the character string larger than the fixed value into M substrings, M being an integer larger than one;
- (a3) inputting the substring into the memory of the electronic device to obtain a second hash value after the sub string is hashed; and
- (a4) obtaining the new character string according to the second hash value of each sub string.

10. The electronic device of claim 8, wherein the step of obtaining the processing result according to the character string further comprises:
when a numerical value of the character string is less than or equal to the fixed value, obtaining the processing result according to the character string.

11. The electronic device of claim 7, wherein the processor is further caused to:
input the initial hash data into the memory of the electronic device to obtain the processing result obtained after the initial hash data is hashed, when the value of the initial hash data is less than or equal to the fixed value.

12. The electronic device of claim 7, wherein the processor is further caused to:
obtain a set of random values, sizes of the random values are random;
divide the initial hash data in size randomly according to the random values.

13. A storage medium having stored thereon instructions that, when executed by a processor of an electronic device, causes the processor to execute instructions of a data processing method, the method comprising:
obtaining initial unhashed data and a fixed value, the initial unhashed data comprising data to be processed of an electronic device, the fixed value comprising a fixed value of a memory cache of the electronic device;
when a value of the initial unhashed data is greater than the fixed value, dividing the initial unhashed data into N sub-data, a value of each sub-data being not more than the fixed value, N being an integer greater than one;
inputting the sub-data into a memory of the electronic device to obtain a first hash value after the sub-data being hashed; and
obtaining a processing result according to the first hash value of each sub-data.

14. The storage medium of claim 13, wherein the step of obtaining a processing result according to the first hash value of each sub-data further comprises:
stringing the first hash value of each sub-data into a character string; and
obtaining the processing result according to the character string.

15. The storage medium of claim 14, wherein the step of obtaining the processing result according to the character string further comprises:
- (a1) when a numerical value of the character string is larger than the fixed value, repeating steps (a2)-(a4) until the numerical value of a new character string is less than or equal to the fixed value;
- (a2) dividing the character string larger than the fixed value into M substrings, M being an integer larger than one;
- (a3) inputting the substring into the memory of the electronic device to obtain a second hash value after the sub string is hashed; and
- (a4) obtaining the new character string according to the second hash value of each sub string.

16. The storage medium of claim 14, wherein the step of obtaining the processing result according to the character string further comprises:

when a numerical value of the character string is less than or equal to the fixed value, obtaining the processing result according to the character string.

17. The storage medium of claim 13, wherein the method further comprises:
when the value of the initial hash data is less than or equal to the fixed value, inputting the initial hash data into the memory of the electronic device to obtain the processing result obtained after the initial hash data is hashed.

18. The storage medium of claim 13, wherein the method further comprises:
obtaining a set of random values, sizes of the random values are random;
dividing the initial hash data in size randomly according to the random values.

* * * * *